United States Patent
Gronbach

(10) Patent No.: US 7,513,323 B2
(45) Date of Patent: Apr. 7, 2009

(54) DC-VOLTAGE VEHICLE ELECTRICAL SYSTEM

(75) Inventor: Roman Gronbach, Korntal (DE)

(73) Assignee: Robert Bosch GmbH, Stuttgart (DE)

( * ) Notice: Subject to any disclaimer, the term of this patent is extended or adjusted under 35 U.S.C. 154(b) by 325 days.

(21) Appl. No.: 10/943,183

(22) Filed: Sep. 16, 2004

(65) Prior Publication Data

US 2005/0067898 A1    Mar. 31, 2005

(30) Foreign Application Priority Data

Sep. 25, 2003    (DE)    ............................. 103 44 563

(51) Int. Cl.
*B60L 1/00*    (2006.01)
(52) U.S. Cl. ..................... 180/65.1; 307/10.1
(58) Field of Classification Search .............. 180/65.1, 180/65.8; 307/9.1, 11, 28, 75, 10.1
See application file for complete search history.

(56) References Cited

U.S. PATENT DOCUMENTS

| | | | |
|---|---|---|---|
| 4,709,318 A * | 11/1987 | Gephart et al. ............... 363/37 |
| 5,404,092 A * | 4/1995 | Gegner ......................... 323/207 |
| 6,038,144 A * | 3/2000 | Matsumoto et al. ........... 363/19 |
| 6,115,230 A * | 9/2000 | Voigts et al. ................. 361/230 |
| 6,225,708 B1 * | 5/2001 | Furukawa et al. ............. 307/66 |
| 6,243,277 B1 * | 6/2001 | Sun et al. ........................ 363/65 |
| 6,320,358 B2 * | 11/2001 | Miller .......................... 323/222 |
| 6,323,608 B1 * | 11/2001 | Ozawa ........................ 318/139 |
| 6,384,489 B1 * | 5/2002 | Bluemel et al. ............. 307/10.1 |
| 6,396,720 B1 * | 5/2002 | Gronbach .................... 363/72 |
| 6,400,589 B2 * | 6/2002 | Abo et al. ..................... 363/65 |
| 6,683,766 B1 * | 1/2004 | Guo et al. ..................... 361/42 |
| 6,710,698 B1 * | 3/2004 | Jehlicka et al. ............. 337/221 |
| 6,782,329 B2 * | 8/2004 | Scott ........................... 702/58 |
| 7,095,137 B2 * | 8/2006 | Mackel et al. ................. 307/28 |

FOREIGN PATENT DOCUMENTS

DE    101 19 985    10/2002
WO    WO 0117090 A1 *    3/2001

* cited by examiner

*Primary Examiner*—Christopher P Ellis
*Assistant Examiner*—Brian Swenson
(74) *Attorney, Agent, or Firm*—Kenyon & Kenyon LLP

(57) ABSTRACT

A DC-voltage vehicle electrical system for a motor vehicle, having a current source and a user. The DC-voltage vehicle electrical system is preferably developed as a 42V multi-voltage vehicle electrical system. A device for the cyclical interruption of the current is provided in the DC-voltage vehicle electrical system, in order to prevent the formation of arcs during switching and plugging procedures under a load at the DC-voltage vehicle electrical system or to end rapidly the formation of arcs, in a simple manner and without expensive constructive or switching technology measures.

11 Claims, 1 Drawing Sheet

DC-VOLTAGE VEHICLE ELECTRICAL SYSTEM

FIELD OF THE INVENTION

The present invention relates to a DC-voltage vehicle electrical system, especially for a motor vehicle.

BACKGROUND INFORMATION

DC-voltage vehicle electrical systems of motor vehicles are known that have a nominal voltage of 12V. Because of the multiplicity of users in DC-voltage vehicle electrical systems or, since users, such as perhaps servomotors of electrical steering systems have to be supplied, a nominal voltage of 12V is frequently not sufficient as energy supply. DC-voltage vehicle electrical systems of 42V are known that have a current source and users, and are developed as multi-voltage vehicle electrical systems. German Patent Application No. DE 101 19 985 describes a multi-voltage electrical system for a motor vehicle, having a first voltage level of 42V and a second voltage level of 14V. The first voltage level and the second voltage level are able to be connected via two parallel, switchable DC/DC converters. High performance users, such as the starter of the motor vehicle or the like, are connected to the first voltage level, a 42V branch of the multi-voltage electrical system, while the second voltage level, a 14V branch of the multi-voltage electrical system, is used to supply the usual users.

The DC/DC converters are able to be used in upwards and downwards operation, and are circuited in such a way that a external terminal point of the vehicle electrical system can be connected to a 42V-end terminal of the DC/DC converter. The switches of such 42V DC-voltage vehicle electrical systems should be provided by constructive measures with arc quenching devices. The power plug connections of such DC-voltage vehicle electrical systems should be disconnected, in order to avoid damage to their plug connectors when the plug is pulled out under load.

SUMMARY OF THE INVENTION

The DC-voltage vehicle electrical system according to the present invention has the advantage that artificial zero passages of the current may be generated by a device for the cyclical interruption of the current in the DC-voltage vehicle electrical system, whereby, during a switching procedure or during the pulling out of a power plug, an arc is reliably and rapidly quenched. Thereby, for example, a motor vehicle having the 42V DC-voltage vehicle electrical system according to the present invention may be started using known, simple designs of starting aid cables. All the switches and plug connections may be produced in the manner of design known from 230V alternating voltage networks, without expensive constructive measures for quenching arcs.

Preferably, because of the device for the cyclical interruption of the current, the current is clocked at a constant period/ interval ratio, the interval time being minimized for the uniform energy transmission to the users. The clock-pulsed DC-voltage vehicle electrical system may be designed as a multi-voltage electrical system, preferably a DC/DC converter being provided for connecting and generating the various voltage levels.

The device for the cyclical interruption of the current, in this context, may be present as a control device for clocking the output voltage of the DC/DC converter in the DC/DC converter. The DC/DC converter, in a method known per se, transforms a supply DC voltage into a higher or lower output voltage as a step-up or step-down transformer. It has a smoothing choke, a switch designed, for example, as an NMOS transistor, a diode and a smoothing capacitor. The smoothing choke is connected to a mass connector via a terminal for the supply voltage and via the other terminal to the anode terminal of the diode and via the switch as well as the smoothing capacitor to a mass connector. The cathode terminal of the diode is connected to the output terminal for the output voltage of the DC/DC converter and via the control device to a control input of the switch.

Preferably, a smart power switch, which is controlled via an external control signal, is used as the control device for the cyclical interruption of the current. The output voltage of the DC/DC converter is clocked, preferably at a period duration of about 10 ms by the smart power switch, zero passages of the current taking place. This clocked DC voltage is also present at feed means for the external energy supply, such as, for instance at a external terminal point of the DC-voltage vehicle electrical system. Because of the clocking of the output voltage of the DC/DC converter, the external terminal point may be developed without constructive or switch technology means for the quenching of arcs, which would be generated during the operation of the external terminal point, such as perhaps upon pulling out the auxiliary starter cable under a load.

If a plurality of DC/DC converters connected in parallel in the DC voltage vehicle electrical system are provided, then for carrying out the loading operation using a 42V voltage source, no switching over of a DC/DC converter to downward operation is required. Rather, direct feeding of electrical energy into the 42V branch of the multi-voltage electrical system may take place, using simple auxiliary starter cables.

DETAILED DESCRIPTION

Figure 1:
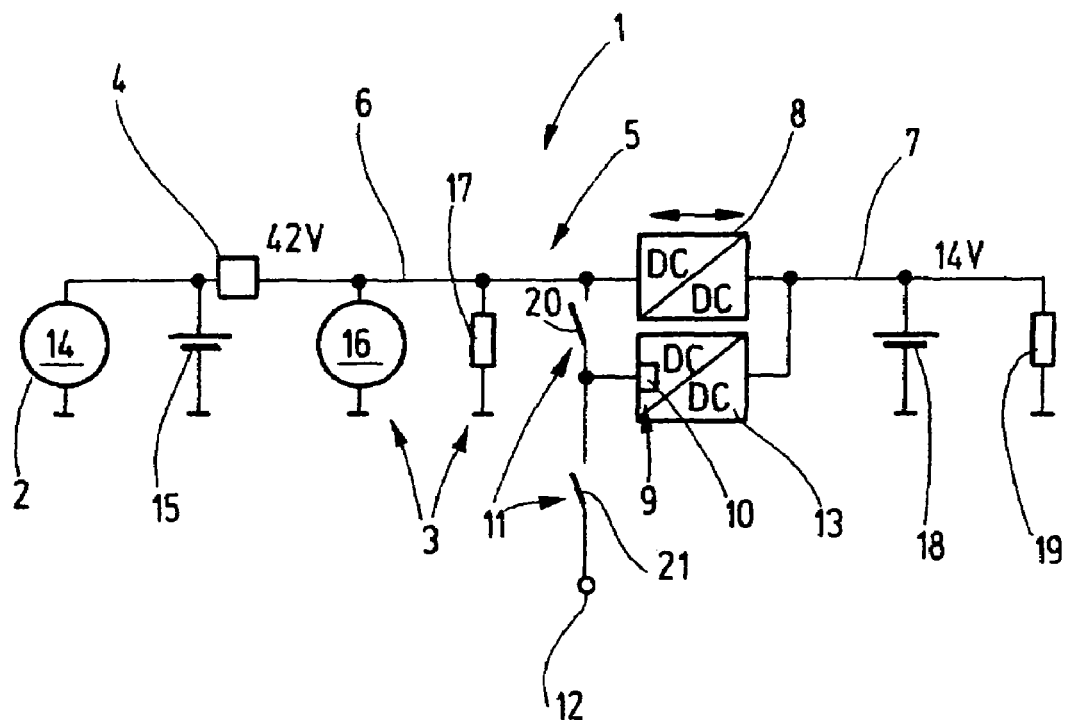
FIG. 1 shows a block diagram of a DC-voltage vehicle electrical system, having a device for the cyclical interruption of the current and an external energy feed.

FIG. 1 shows a block diagram of a DC-voltage vehicle electrical system 1 of a motor vehicle designed as a multi-voltage electrical system 5. Multi-voltage electrical system 5 is formed by a current source 2 designed as a generator 14, a 36V battery 15, a starter 16, as well as various users 3 developed as high current loads 17. A first voltage level 6 is connected, using a first DC/DC converter 8, to a second voltage level 7, a 14V branch of the multi-voltage electrical system 5. A 12V battery 18 and 14V loads 19 are connected in parallel to ground at the 14V branch. A second DC/DC converter 13 is connected in parallel to DC/DC converter 8 via a feed means 11 developed as a first switching means 20, on the 42V side. First switching means 20 is used to separate second DC/DC converter 13 from the 42V branch. DC/DC converters 8, 13 may be operated in master/slave operation.

An external loading terminal point 12 is able to be connected to the 42V-side terminal of second DC/DC converter 13 via a feed means 11 developed as a second switching means 21. In normal operation of DC-voltage vehicle electrical system 1, first switching means 20 is closed and second switching means 21 is open. Both first DC/DC converter 8 and second DC/DC converter 13 are utilized in the downward operation to support the 14V voltage level by the 42V side. At least second DC/DC converter 13 may be operated bidirectionally in upwards and downwards operation.

Loading operation deviating from normal operation by external energy supply at external loading terminal point 12 is able to take place in two ways. First switching means 20 is set in the sense of an "open" position and second switching means in the sense of a "closed" position. Thereby electrical energy may be fed into the 14V branch of multi-voltage electrical system 5 via external loading terminal point 12 and second DC/DC converter 13, and possibly via first DC/DC converter 8 into the 42V branch.

If switching means 20 and 21 are closed, electrical energy may also be fed directly into the 42V branch of multi-voltage electrical system 5.

Now, in order to develop the switching means and plug connections in the 42V branch of DC-voltage vehicle electrical system 1 without expensive constructive or switching technology measures for the quenching of arcs, it is provided, according to the present invention, that the current in the 42V branch be clocked for cyclical interruption of the current by a device 4.

Figure 2:
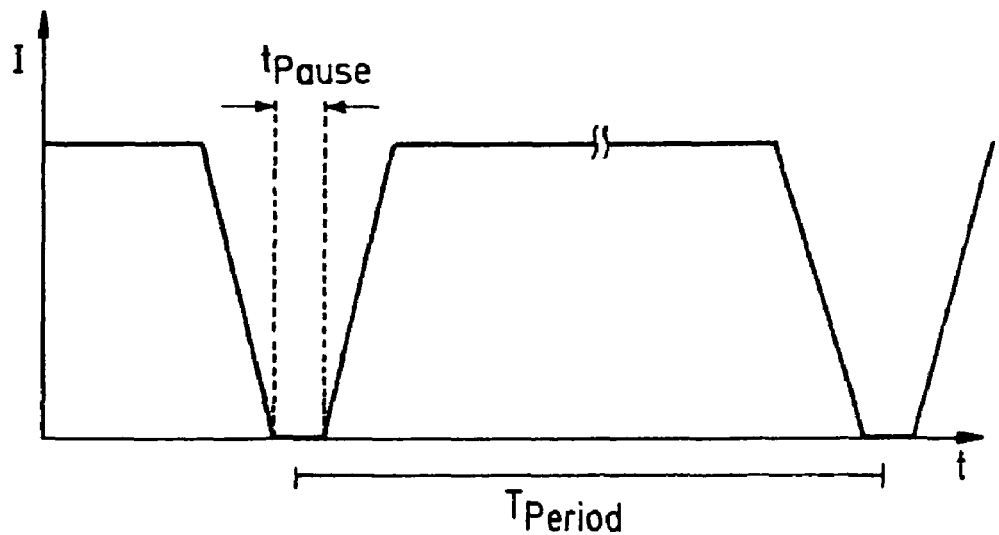
FIG. 2 shows a diagram having the current curve at an external loading terminal point of the DC-voltage vehicle electrical system in FIG. 1.

As shown in FIG. 2, device 4 effects cyclical zero passage of the current. Device 4 is preferably designed as smart power switch 10, which may also be developed as control device 9 for clocking the output voltage in second DC/DC converter 13. Smart power switch 10 may be formed by a SIPMOS power semiconductor having a control input, a FET power transistor at the output which is controlled via the control input by an external control signal, a charge pump connected to the gate of the FET power transistor for increasing the voltage for the high-side operation and a switching logic.

What is claimed is:

1. A DC-voltage vehicle electrical system comprising:
a current source;
a user; and
a device situated for cyclically reducing and increasing a current in the DC-voltage vehicle electrical system to zero and above zero, respectively;
wherein the current cyclically reduced to zero and increased above zero is supplied to at least one load.

2. The DC-voltage vehicle electrical system according to claim 1, wherein the system is for a motor vehicle.

3. The DC-voltage vehicle electrical system according to claim 1, wherein the device clocks the current at a constant period/interval ratio.

4. The DC-voltage vehicle electrical system according to claim 3, wherein a period duration of the current amounts to about 10 ms.

5. The DC-voltage vehicle electrical system according to claim 1, wherein the system is a multi-voltage vehicle electrical system having at least one first voltage level and a second voltage level.

6. The DC-voltage vehicle electrical system according to claim 5, wherein the voltage levels of the system are connected to at least one DC/DC converter.

7. The DC-voltage vehicle electrical system according to claim 6, wherein the device for cyclically reducing and increasing the current to zero and above zero, respectively, is formed by a control device of the DC/DC converter.

8. The DC-voltage vehicle electrical system according to claim 1, wherein the device includes a smart power switch.

9. The DC-voltage vehicle electrical system according to claim 1, further comprising a feed arrangement for an external energy supply by an external loading terminal point.

10. The DC-voltage vehicle electrical system according to claim 9, wherein the external loading terminal point is capable of connecting to the system via a DC/DC converter.

11. The DC-voltage vehicle electrical system according to claim 1, further comprising at least two DC/DC converters connected in parallel, which are capable of being controlled in an upwards operation and a downwards operation.

* * * * *